United States Patent
Baba (10) Patent No.: US 8,861,665 B2
(45) Date of Patent: Oct. 14, 2014

(54) COMMUNICATION SYSTEM, COMMUNICATION DEVICE, AND METHOD FOR OPERATING COMMUNICATION SYSTEM

(71) Applicant: MegaChips Corporation, Osaka (JP)

(72) Inventor: Eiji Baba, Kitakatsuragigun (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 13/790,390

(22) Filed: Mar. 8, 2013

(65) Prior Publication Data

US 2013/0259108 A1 Oct. 3, 2013

(30) Foreign Application Priority Data

Mar. 28, 2012 (JP) ................. 2012-073579

(51) Int. Cl.
- *H04L 7/00* (2006.01)
- *H04L 5/16* (2006.01)
- *H04L 27/00* (2006.01)
- *H04L 1/16* (2006.01)
- *H04L 1/00* (2006.01)
- *H04B 3/54* (2006.01)

(52) U.S. Cl.
CPC ............ *H04L 1/0042* (2013.01); *H04L 1/1678* (2013.01); *H04B 3/542* (2013.01); *H04B 3/54* (2013.01); *H04B 2203/542* (2013.01)
USPC ............................ 375/358; 375/219; 375/259

(58) Field of Classification Search
CPC ............... H04B 3/54; H04B 2203/542; H04B 2203/5416; H04B 3/546; H04L 12/2803; H04L 25/02; H04L 7/0054; G01R 31/1272; H02J 3/24; H04J 3/0605; G08B 13/2488; G05B 2219/21136

USPC ........ 375/219, 259, 260, 257, 256, 355, 354, 375/358, 362–366, 377, 224, 295, 296, 375/285; 340/538, 12.32, 310.11, 12.35, 340/358.13, 13.23, 310.12, 3.2, 465, 405; 370/503, 509–514; 455/402, FOR. 202

See application file for complete search history.

(56) References Cited

U.S. PATENT DOCUMENTS

| | | | |
|---|---|---|---|
| 4,845,466 A | * | 7/1989 | Hariton et al. ................. 375/257 |
| 2012/0126612 A1 | * | 5/2012 | Hurwitz et al. ................... 307/3 |

FOREIGN PATENT DOCUMENTS

JP  2009-284159  12/2009

* cited by examiner

*Primary Examiner* — Tesfaldet Bocure (74) *Attorney, Agent, or Firm* — Oblon, Spivak, McClelland, Maier & Neustadt, L.L.P.

(57) ABSTRACT

A communication system includes a first communication device and a second communication device that performs power line communication with the first communication device via an electric power line, wherein the first communication device transmits an initial packet signal added with an error detection code in each zero crossing period including zero crossing timing while changing transmission timing within the zero crossing period. The second communication device specifies optimum communication timing out of a plurality of pieces of transmission timing within the zero crossing periods based on a result of error detection on each initial packet signal, and transmits an ACK signal including timing information on the optimum communication timing. Then, the first communication device transmits a data packet signal in the optimum communication timing within the zero crossing period, which is specified based on the timing information.

12 Claims, 7 Drawing Sheets

COMMUNICATION SYSTEM, COMMUNICATION DEVICE, AND METHOD FOR OPERATING COMMUNICATION SYSTEM

BACKGROUND OF THE INVENTION

The present invention relates to a communication technique.

DESCRIPTION OF THE BACKGROUND ART

In recent years, power line communication (PLC) using a power line for supplying electric power to an electric appliance has been put to practical use. In the power line communication, a communication signal with a higher frequency than a commercial power supply frequency is superimposed on commercial electric power, to perform communication.

However, since the power line communication is a communication system in which an electric power line connected with a domestic electric appliance is used as a transmission path, communication quality may deteriorate under the influence of noise of the electric appliance (referred to as "home appliance noise").

The influence of this home appliance noise increases in the vicinity of a peak where a commercial alternate current (AC) voltage waveform has the maximum amplitude, and in order to avoid this, there has been proposed a technique of performing power line communication in a so-called vicinity of a zero crossing where the AC voltage waveform has zero amplitude (e.g. Japanese Patent Application Laid-Open No. 2009-284159).

In the case of performing communication in the vicinity of the zero crossing, zero crossing timing is detected in which the commercial AC voltage waveform has zero amplitude, and based on the detected zero crossing timing, the timing of communicating a transmission signal is decided

SUMMARY OF THE INVENTION

However, in the zero crossing timing, a cyclic phase change, which is called phase noise and generated from a switching power supply or the like, may be generated in the vicinity of the zero crossing timing, and when such a phase change occurs in a transmission period of a transmission signal, the transmission signal may not be demodulated on a reception side.

Further, cyclic power noise in synchronization with the zero crossing timing may exist in the electric power line, and when communication is performed in the vicinity of the zero crossing, it may be affected by the pulse noise.

As thus described, even in the case of performing communication in the vicinity of the zero crossing, communication quality may deteriorate under the influence of noise.

Accordingly, it is an object of the present invention to provide a technique capable of realizing highly reliable communication in the case of performing power line communication in the vicinity of a zero crossing.

A first aspect of a communication system according to the present invention is a communication system, including: a first communication device; and a second communication device that performs electric power line communication with the first communication device with an electric power line used as a transmission path, wherein the first communication device has detection means for detecting zero crossing timing at regular intervals in a commercial power supply, and transmission means for transmitting an initial signal added with an error detection code in each zero crossing period including zero crossing timing while changing transmission timing within the zero crossing period, the second communication device has error detecting means for performing error detection on each initial signal received in each zero crossing period based on the error detection code added to the each initial signal, specification means for specifying optimum communication timing out of a plurality of pieces of transmission timing within the zero crossing periods based on a result of error detection on the each initial signal, and transmission means for transmitting a response signal including timing information on the optimum communication timing, the first communication device further has reception means for receiving the response signal, and the transmission means of the first communication device transmits a transmission signal including actual data in the optimum communication timing within the zero crossing period which has been specified based on the timing information.

Further, a second aspect of the communication system according to the present invention is the first aspect in which each shifting width with respect to the zero crossing timing of the plurality of pieces of transmission timing within the zero crossing periods is set based on a frequency of the commercial power supply.

Further, a third aspect of the communication system according to the present invention is the first or second aspect in which the specification means of the second communication device also specifies a communication state based on the result of error detection on each initial signal, the transmission means of the second communication device transmits the response signal including communication state information on the communication state, the reception means of the first communication device receives the response signal, the transmission means of the first communication device transmits the transmission signal in each zero crossing period, and the transmission means of the first communication device suspends transmission of the transmission signal in a case where the number of transmission of the transmission signal in each zero crossing period has reached the number corresponding to the number specified based on the communication state information, and retransmits the initial signal in each zero crossing period while changing the transmission timing within the zero crossing period.

Further, a fourth aspect of the communication system according to the present invention is the first or second aspect in which the transmission means of the first communication device transmits in each zero crossing period the transmission signal added with an error detection code and including actual data, the error detection means of the second communication device performs error detection on each transmission signal received in each zero crossing period, the transmission means of the second communication device transmits a signal including a command to retransmit the initial signal based on the result of error detection on each transmission signal, and the transmission means of the first communication device suspends transmission of the transmission signal and retransmits the initial signal in each zero crossing period while changing the transmission timing within the zero crossing period in a case where the signal including the command to retransmit the initial signal is received.

Further, a first aspect of a communication device according to the present invention is a communication device on a transmission side, which performs electric power line communication with a communication device on a reception side with an electric power line used as a transmission path, the communication device on the transmission side including: detection means for detecting zero crossing timing at regular intervals in a commercial power supply; and transmission means for transmitting an initial signal added with an error detection code in each zero crossing period including zero crossing timing while changing transmission timing within the zero crossing period, wherein the communication device on the reception side has error detecting means for performing error detection on each initial signal received in each zero crossing period based on the error detection code added to the each initial signal, specification means for specifying optimum communication timing out of a plurality of pieces of transmission timing within the zero crossing periods based on a result of error detection on each initial signal, and transmission means for transmitting a response signal including timing information on the optimum communication timing, the communication device on the transmission side further has reception means for receiving the response signal, and the transmission means of the communication device on the transmission side transmits a transmission signal including actual data in the optimum communication timing within the zero crossing period, which is specified based on the timing information.

Further, a second aspect of a communication device according to the present invention is a communication device on a reception side, which performs electric power line communication with a communication device on a transmission side with an electric power line used as a transmission path, wherein the communication device on the transmission side has detection means for detecting zero crossing timing at regular intervals in a commercial power supply, and transmission means for transmitting an initial signal added with an error detection code in each zero crossing period including zero crossing timing while changing transmission timing within the zero crossing period, and the communication device on the reception side including: error detecting means for performing error detection on each initial signal received in each zero crossing period based on the error detection code added to the each initial signal; specification means for specifying optimum communication timing out of a plurality of pieces of transmission timing within the zero crossing periods based on a result of error detection on each initial signal; and transmission means for transmitting a response signal including timing information on the optimum communication timing.

Further, a method for operating a communication system according to the present invention is a method for operating a communication system, which includes a first communication device and a second communication device that performs electric power line communication with the first communication device with an electric power line used as a transmission path, the method including the steps of: a) detecting zero crossing timing at regular intervals in a commercial power supply in the first communication device; b) transmitting an initial signal added with an error detection code in each zero crossing period including zero crossing timing while changing transmission timing within the zero crossing period, in the first communication device; c) performing error detection on each initial signal received in each zero crossing period based on the error detection code added to the each initial signal in the second communication device; d) specifying optimum communication timing out of a plurality of pieces of transmission timing within the zero crossing period based on a result of error detection on each initial signal in the second communication device; e) transmitting a response signal including timing information on the optimum communication timing in the second communication device; and f) transmitting a transmission signal that includes actual data in the optimum communication timing within the zero crossing period, which is specified based on the timing information included in the response signal in the first communication device.

According to the foregoing present invention, in the case of performing power line communication in the vicinity of a zero crossing, highly reliable communication can be realized.

DESCRIPTION OF THE PREFERRED EMBODIMENTS

Hereinafter, preferred embodiments will be described with reference to the drawings. It should be noted that elements provided with the same numeral in different drawings show elements being the same as or corresponding to each other.

1. PREFERRED EMBODIMENT

[1-1. Configuration of Communication System]

Figure 1:
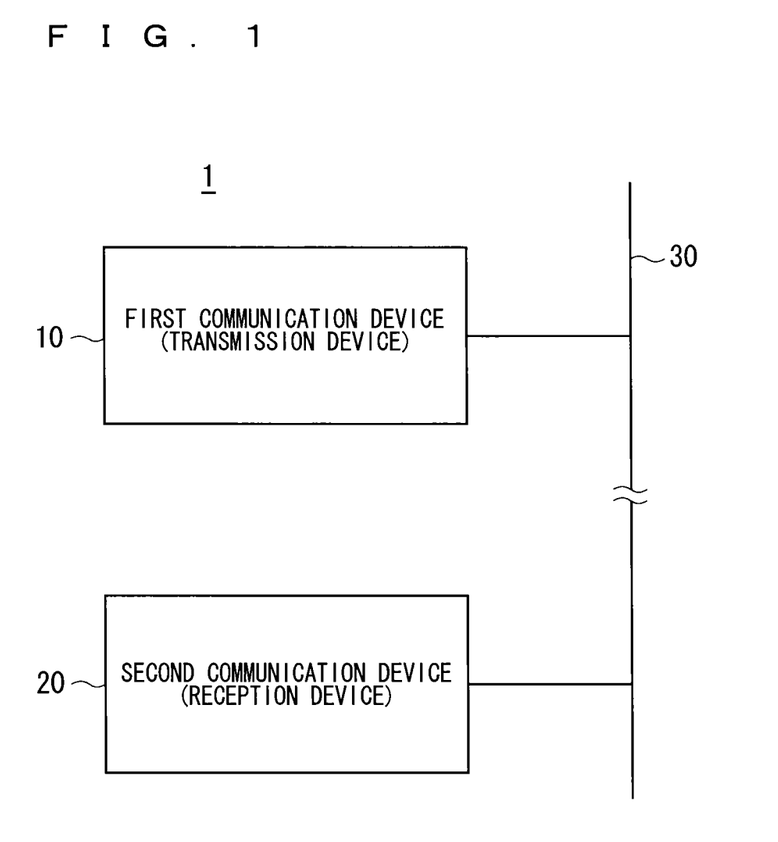
FIG. 1 is a constitutional diagram of a communication system according to the present preferred embodiment.

FIG. 1 is a constitutional diagram of a communication system 1 according to the present preferred embodiment.

As shown in FIG. 1, the communication system 1 has a first communication device 10 and a second communication device 20. The first communication device 10 and the second communication device 20 in the communication system 1 are each connected to an electric power line 30. Then, the first communication device 10 and the second communication device 20 are configured so as to be communicable to each other by power line communication (PLC) with an electric power line 30 used as a transmission path.

Further, the power line communication between the communication devices 10 and 20 is performed using an OFDM (Orthogonal Frequency Division Multiplexing) signal obtained by synthesizing a plurality of subcarriers orthogonal to each other on a frequency axis. Then, the OFDM signal is divided into a certain time unit and transmitted by packet unit.

In addition, although a case will be illustrated below where the first communication device 10 functions mainly as a transmission device and the second communication device 20 functions mainly as a reception device, the first communication device 10 and the second communication device 20 may have similar communication functions.

Figure 2:
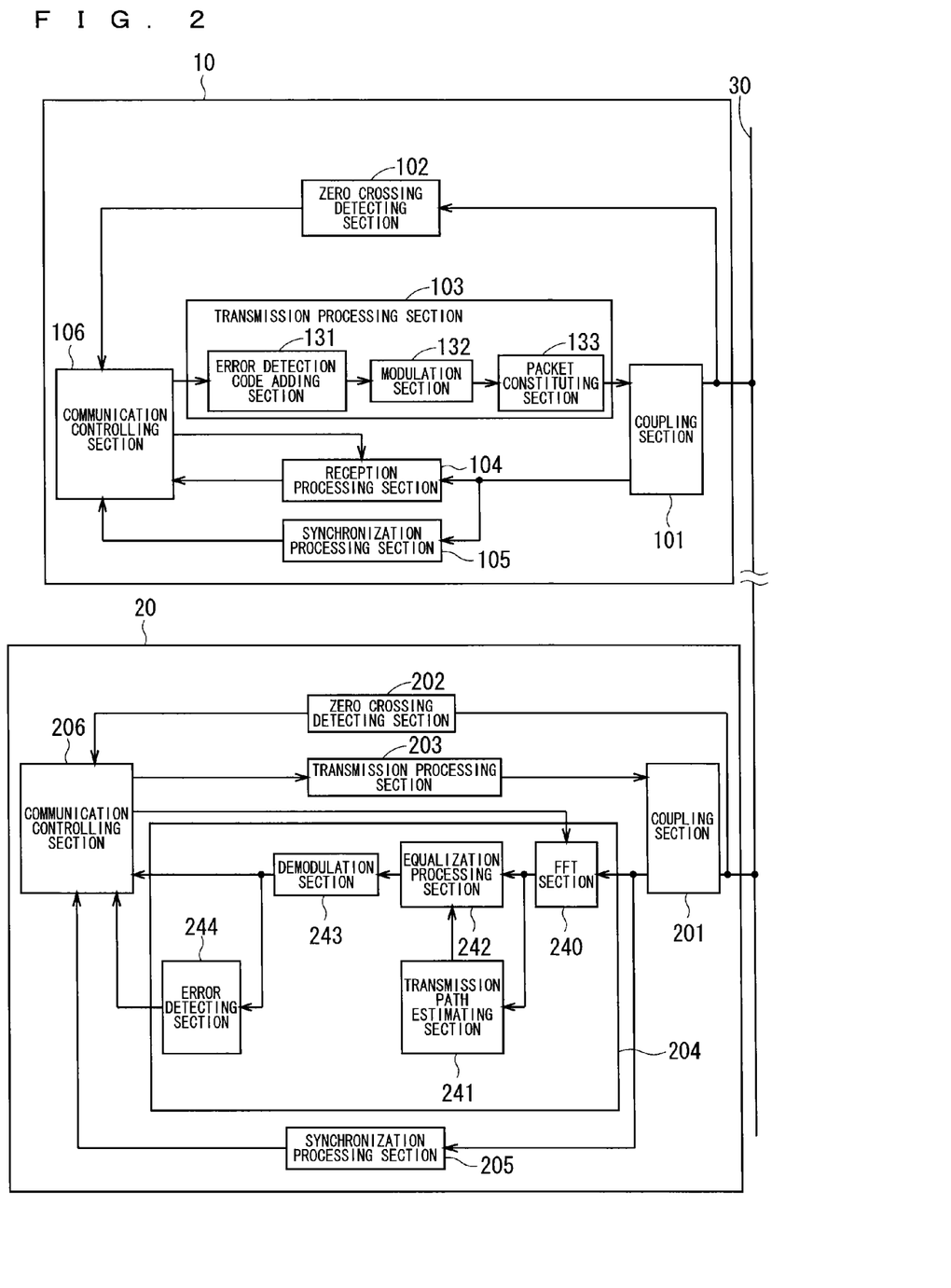
FIG. 2 is a block diagram showing functional configurations of a first communication device and a second communication device.

Hereinafter, respective configurations of the first communication device 10 and the second communication device 20 which constitute the communication system 1 will be described in this order. FIG. 2 is a block diagram showing functional configurations of the first communication device 10 and the second communication device 20.

As shown in FIG. 2, the first communication device (transmission device) 10 is provided with a coupling section 101, a zero crossing detecting section 102, a transmission processing section 103, a reception processing section 104, a synchronization processing section 105, and a communication controlling section 106.

The coupling section 101 is connected with the electric power line 30, and has a function to convert an OFDM signal inputted from the transmission processing section 103 to a communication signal (PLC signal) for performing power line communication, and output the PLC signal as a transmission signal (sending signal) to the electric power line 30. Further, the coupling section 101 has a function to take the PLC signal out of the electric power line 30, and output the PLC signal as a reception signal to the reception processing section 104.

The zero crossing detecting section (detection means) 102 detects timing in which a commercial AC voltage waveform has zero amplitude (also referred to as "zero crossing timing"), and outputs a detection signal in synchronization with the zero crossing timing. It is to be noted that an interval between adjacent zero crossing timing is a regular interval, and also referred to as a "zero crossing interval".

The transmission processing section 103 has an error detection code adding section 131, a modulation section 132 and a packet constituting section 133, acquires data as a transmission object (also referred to as "transmission data") from the communication controlling section 106, and modulates the transmission data, to generate an OFDM signal including transmission data.

Specifically, the error detection code adding section 131 adds an error detection code such as a checksum or a CRC (Cyclic Redundancy Check) code to the transmission data inputted from the communication controlling section 106, and outputs the data after the addition to the modulation section 132.

The modulation section 132 performs primary modulation and inverse fast Fourier transformation on the transmission data after the addition of the error detection code, to generate an OFDM signal. The generated OFDM signal is outputted to the packet constituting section 133.

The packet constituting section 133 adds a preamble signal to the OFDM signal outputted from the modulation section 132, to generate a packet-unit signal (also referred to as "packet signal").

Figure 3:
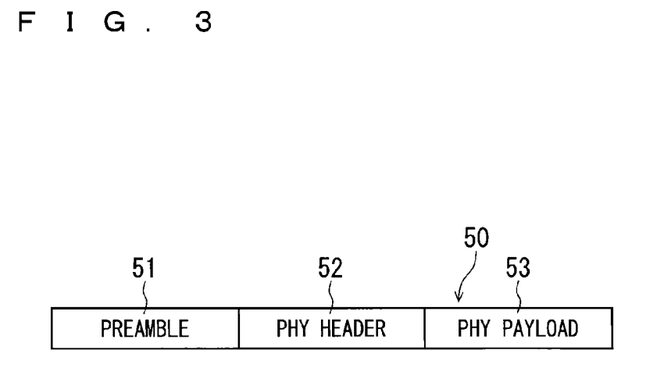
FIG. 3 is a diagram showing a configuration of a packet.

A configuration of the packet (packet signal) that is generated in the packet constituting section 133 will be described here. FIG. 3 is a diagram showing the configuration of the packet.

As shown in FIG. 3, a packet 50 includes a preamble 51, a PHY (physical layer) header 52 that follows the preamble 51, and a PHY payload 53 that follows the PHY header 52.

The preamble 51 is used for a variety of synchronization processing, such as detection processing performed on the reception side for a packet signal transmitted from the transmission side, and symbol timing synchronization.

The PHY header 52 includes header information such as a transmission speed, a data length and the like of subsequently transmitted transmission data.

The PHY payload 53 includes transmission data for an object to be transmitted.

The packet constituting section 133 generates a packet signal including the preamble 51, the PHY header 52 and the PHY payload 53, and outputs the packet signal to the coupling section 101.

Returning to the description of the first communication device 10 in FIG. 2, the reception processing section 104 has a function to demodulate the reception signal inputted from the coupling section 101 and generate reception data. The reception data generated in the reception processing section 104 is outputted to the communication controlling section 106.

In cooperation with the communication controlling section 106, the synchronization processing section 105 performs a variety of synchronization processing such as frequency synchronization and symbol timing synchronization (symbol synchronization).

The communication controlling section 106 controls a communication operation in the first communication device 10.

Specifically, the communication controlling section 106 generates transmission data, and outputs the transmission data to the error detection code adding section 131 of the transmission processing section 103. Further, the communication controlling section 106 controls the timing of outputting a transmission signal to the outside of the first communication device 10 (also referred to as "transmission timing" or "communication timing").

More specifically, the communication controlling section 106 specifies zero crossing timing based on a detection signal from the zero crossing detecting section 102, and controls the coupling section 101 so as to output a transmission signal in a specific period including the zero crossing (also referred to as "zero crossing period"). In such a manner, the communication controlling section 106 functions as transmission means in cooperation with the coupling section 101.

Next, the configuration of the second communication device 20 (reception device) will be detailed. Since the second communication device 20 has a similar configuration to that of the first communication device 10, a characteristic portion as the reception device (configuration of a reception processing section 204) will be described in more detail here.

As shown in FIG. 2, the second communication device 20 is provided with a coupling section 201, a zero crossing detecting section 202, a transmission processing section 203, the reception processing section 204, a synchronization processing section 205, and a communication controlling section 206.

The coupling section 201 has a similar function to that of the foregoing coupling section 101. That is, the coupling section 201 is connected to the electric power line 30, and has a function to convert an OFDM signal inputted from the transmission processing section 203 to a PLC signal, and output the PLC signal to the electric power line 30. Further, the coupling section 201 has a function to take the PLC signal out of the electric power line 30, and output the PLC signal as a reception signal to the reception processing section 204.

The zero crossing timing 202 detects zero crossing timing in which a commercial AC voltage waveform has zero amplitude, and outputs a detection signal in synchronization with the detected zero crossing timing.

Similar to the foregoing transmission processing section 103, the transmission processing section 203 acquires transmission data from the communication controlling section 206, and modulates the transmission data, to generate an OFDM signal including transmission data.

The reception processing section (reception processing means) 204 has an FFT section 240, a transmission path estimating section 241, an equalization processing section 242, a demodulation section 243, and an error detecting section 244, and has a function to demodulate the reception signal inputted from the coupling section 201 and generate reception data.

Specifically, the FFT section 240 executes so-called multicarrier demodulation processing, which is to perform fast Fourier transformation on the reception signal and convert a signal in a time region to a signal in a frequency region. The reception signal outputted from the FFT section 240 after the multicarrier demodulation processing is inputted into the transmission path estimating section 241 and the equalization processing section 242.

Using a pilot signal included in the reception signal, the transmission path estimating section 241 calculates a transmission-path characteristic of a subcarrier having transmitted the pilot signal (transmission-path characteristic of the pilot signal). Then, the transmission path estimating section 241 executes interpolation processing by use of the transmission-path characteristic of the pilot signal, thereby to estimate a transmission-path characteristic of a subcarrier having transmitted another signal other than the pilot signal. Such a transmission-path characteristic of another signal other than the pilot signal, obtained by the transmission-path estimating processing (also referred to as "estimated transmission-path characteristic") is outputted to the equalization processing section 242.

The equalization processing section 242 performs equalization processing which is to divide the reception signal by the estimated transmission-path characteristic corresponding to the reception signal. The reception signal outputted from the equalization processing section 242 after the equalization processing is outputted to the demodulation section 243.

The demodulation section 243 performs subcarrier demodulation processing such as demapping processing on the reception signal after the equalization processing, and outputs demodulated reception data to the error detecting section 244 and the communication controlling section 206.

The error detecting section 244 performs error detection on the reception data based on an error detection code added to the reception data. A result of the error detection is outputted to the communication controlling section 206.

In cooperation with the communication controlling section 206, the synchronization processing section (synchronization processing means) 205 performs a variety of synchronization processing such as frequency synchronization which is to adjust an error of a carrier frequency, and symbol timing synchronization which is to detect an OFDM signal having reached the second communication device 20 and synchronize timing of an OFDM symbol and the multicarrier demodulation processing, and acquires synchronization information.

The communication controlling section 206 controls a communication operation in the second communication device 20. Specifically, the communication controlling section 206 acquires reception data demodulated in the reception processing section 204.

Further, the communication controlling section 206 has a function as communication timing deciding means for deciding optimum communication timing within the zero crossing period based on the result of the error detection. The communication controlling section 206 then generates an ACK (Acknowledgement) signal including information on the optimum communication timing, and outputs the signal to the transmission processing section 203.

[1-2. Communication Aspect of Communication System]

Figure 4:
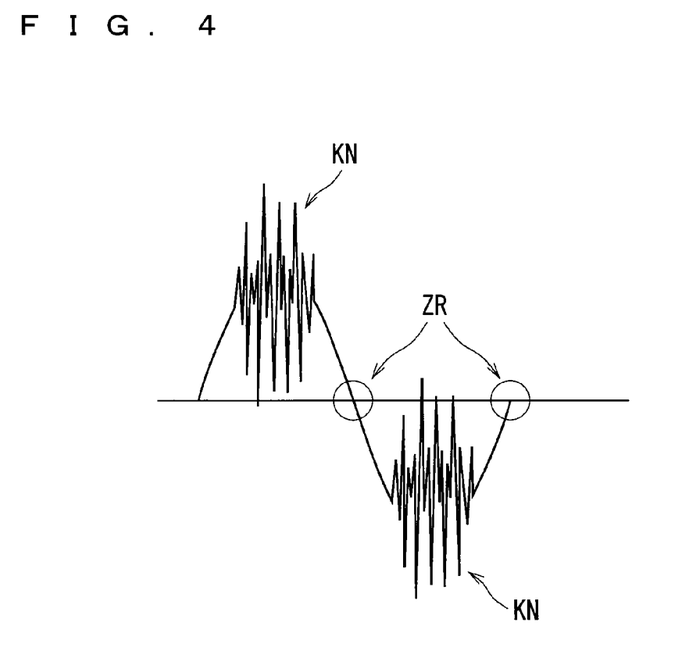
FIG. 4 is a diagram showing an overview of a communication aspect in the communication system.
Figure 5:
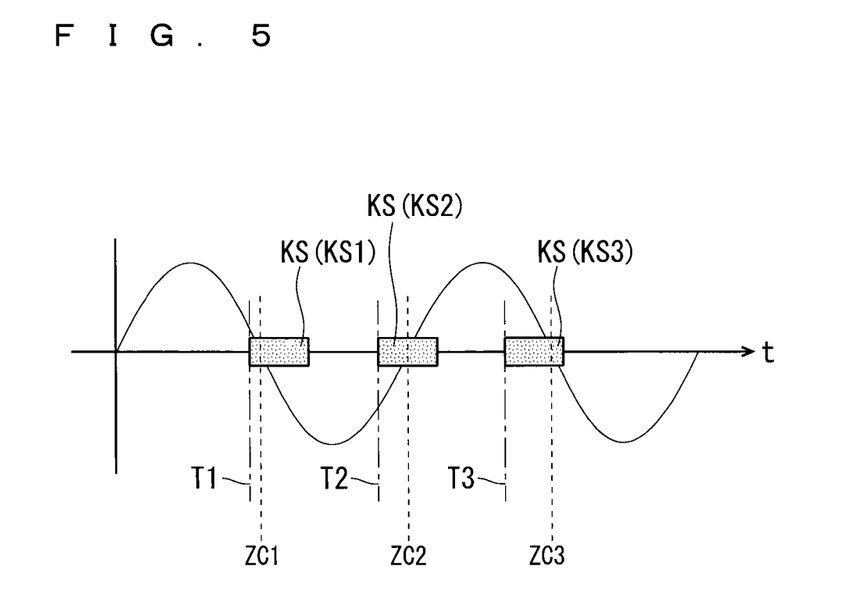
FIG. 5 is a diagram showing a transmission aspect of an initial packet signal that is transmitted at an initial stage of communication.
Figure 6:
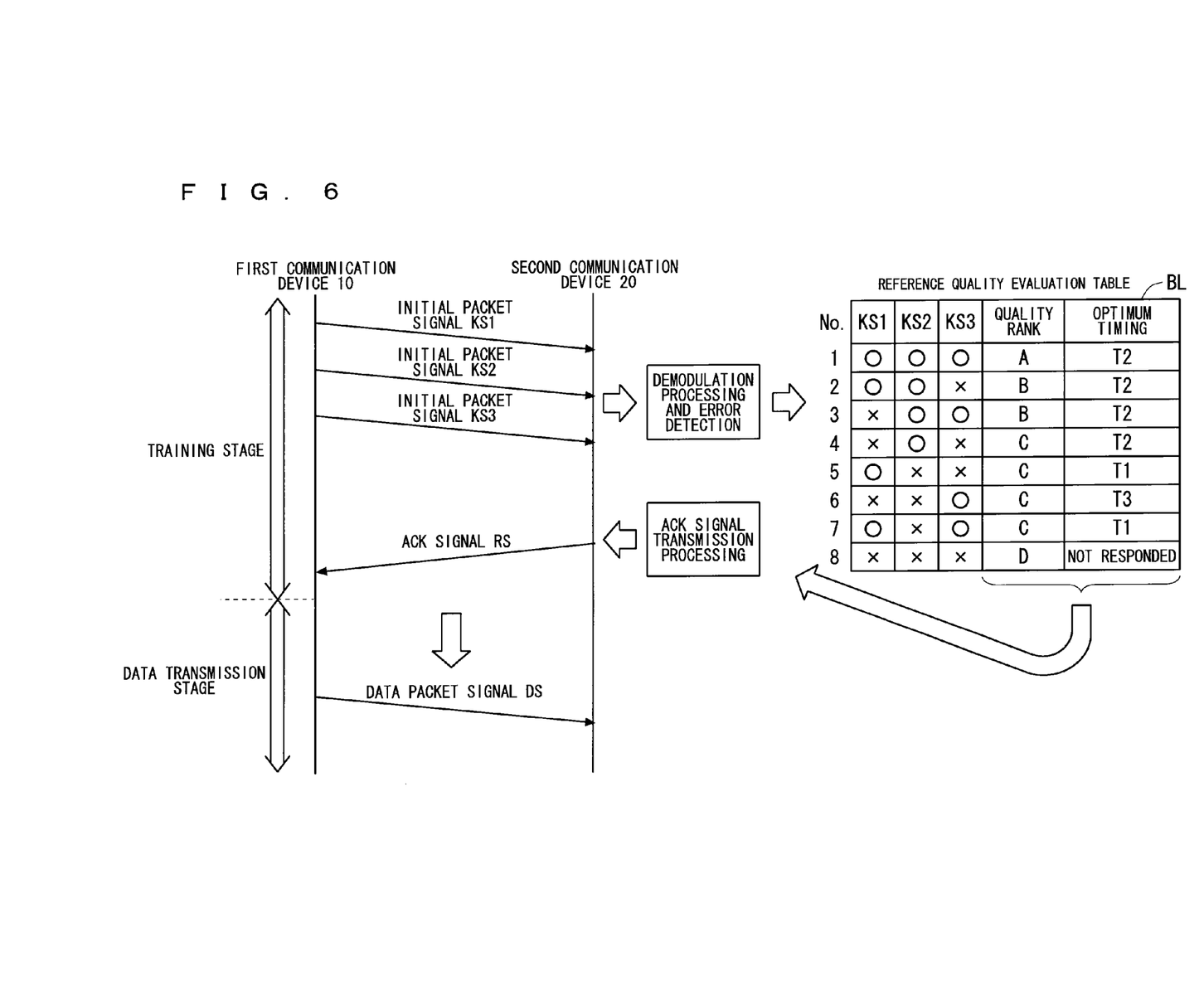
FIG. 6 is a diagram showing an overall operation of the communication system.

Next, there will be described a communication aspect of power line communication performed between the communication devices 10 and 20 having the configurations as described above. FIG. 4 is a diagram showing an overview of a communication aspect in the communication system 1. FIG. 5 is a diagram showing a transmission aspect of an initial packet signal KS that is transmitted at an initial stage of communication. FIG. 6 is a diagram showing an overall operation of the communication system 1.

The power line communication that is performed between the communication devices 10 and 20 is performed in a specific period in order to avoid the influence of home appliance noise that is generated by an electric appliance connected to the electric power line 30.

Specifically, as shown in FIG. 4, since the influence of home appliance noise KN becomes large in the vicinity of a peak where a commercial AC voltage waveform has a peak amplitude, power line communication between the communication devices 10 and 20 is performed in a specific period in a so-called vicinity ZR of a zero crossing where the AC voltage waveform has zero amplitude.

As thus described, in order to avoid the influence of the home appliance noise, the communication system 1 is configured such that power line communication is performed in the zero crossing period including a zero crossing point where the commercial AC voltage waveform has zero amplitude.

Then, as shown in FIG. 5, at an initial stage (training stage) before establishing communication, the first communication device 10 transmits an initial packet signal (initial signal) KS for establishing communication in each of zero crossing periods that sequentially come.

Herein, the timing of transmitting the initial packet signal KS that is transmitted in each zero crossing period will be detailed. FIG. 5 shows three initial packet signals KS1 to KS3 that are transmitted at the training stage.

Transmission timing T1 within a zero crossing period of the first initial packet signal KS1 out of the three initial packet signals KS1 to KS3 is timing later than transmission timing T2, T3 within zero crossing periods of the other initial packet signals KS2, KS3. Further, the transmission timing T2 within the zero crossing period of the second initial packet signal KS2 is timing earlier than the transmission timing T1 within the zero crossing period of the first initial packet signal KS1 and timing later than the transmission timing T3 within the zero crossing period of the third initial packet signal KS3. Moreover, the transmission timing T3 within the zero crossing period of the third initial packet signal KS3 is timing earlier than the transmission timing T1, T2 within the zero crossing periods of the other initial packet signals KS1, KS2.

As thus described, in the respective zero crossing periods, the respective initial packet signals KS1 to KS3 are transmitted in the different timing T1 to T3 within the zero crossing periods. It is to be noted that shifts of the transmission timing within the respective zero crossing periods regarding the respective initial packet signals KS1 to KS3 can be readily grasped when considered with reference to the zero crossing timing ZC1 to ZC3 in the respective zero crossing periods.

A shifting width (shifting width) of each transmission timing with respect to each of the zero crossing timing ZC1 to ZC3 is set to a different value in accordance with a frequency of a commercial power supply, and the shift width is preferably set to one eleventh to one thirteenth of the zero crossing interval. This is because, if the shifting width is excessively large, a signal is transmitted in timing deviating from the zero crossing period, thereby making the operation susceptible to home appliance noise, and if the shifting width is excessively small, any of the initial packet signals KS1 to KS3 is likely to be affected by phase noise or pulse noise. It is to be noted that the zero crossing interval is 10 ms in a commercial power supply with a frequency of 50 Hz, and the zero crossing interval is 8.3 ms in a commercial power supply with a frequency of 60 Hz.

Meanwhile, the second communication device 20 decides optimum transmission timing within the zero crossing period based on the received plurality of initial packet signals KS, and transmits to the first communication device 10 an ACK signal RS including communication information on the optimum transmission timing (see FIG. 6).

The first communication device 10 specifies optimum transmission timing based on communication information included in the ACK signal at a data transmission stage after receiving the ACK signal transmitted from the second communication device 20, and transmits a data packet signal DS including actual data as transmission data (transmission actual data).

[1-3. Operation of Communication System]

Figure 7:
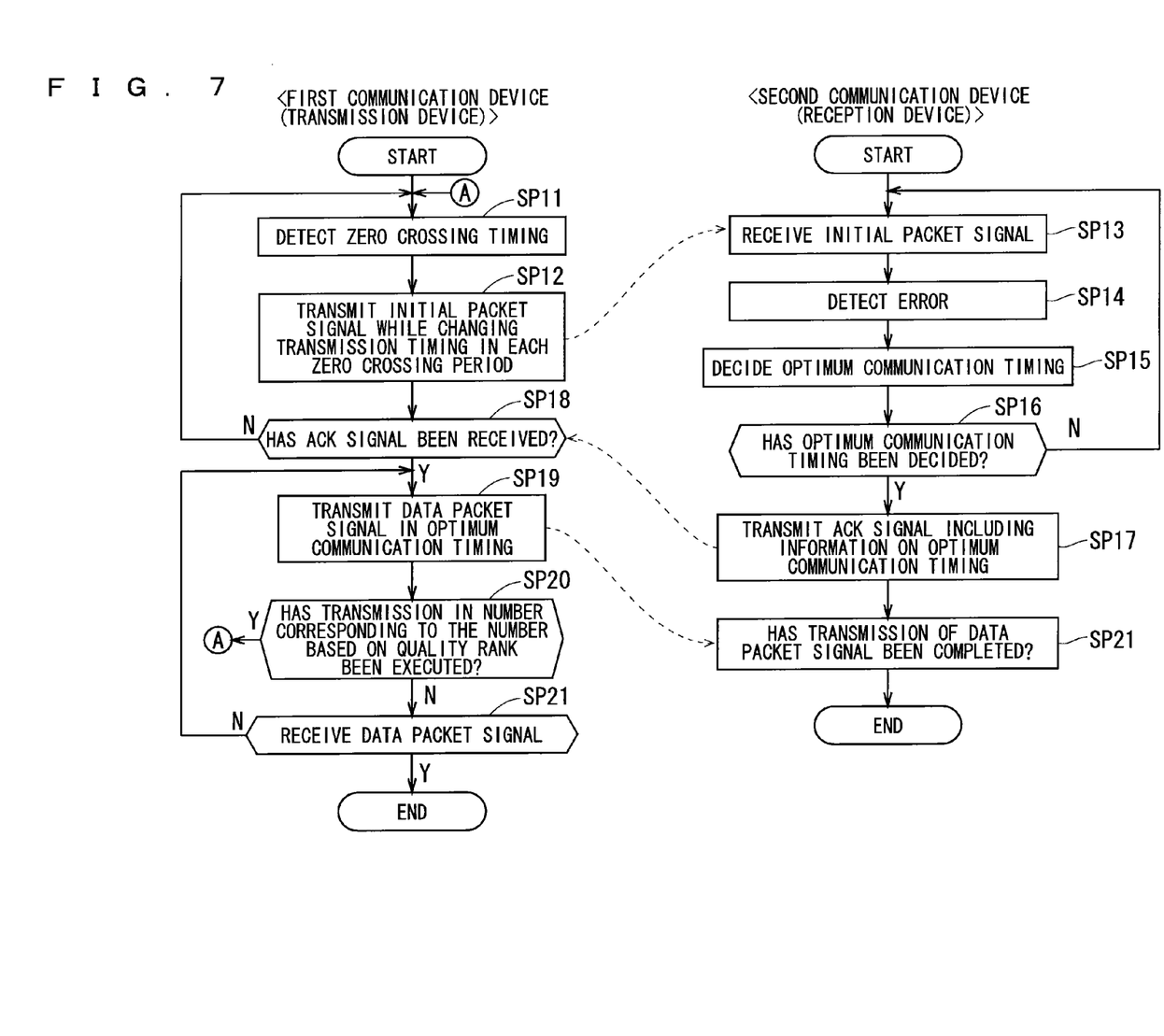
FIG. 7 is a flowchart showing an operation of the communication system.

Next, the operation of the communication system 1 will be detailed. FIG. 7 is a flowchart showing the operation of the communication system 1. It is to be noted that, although the operation of the first communication device 10 as the transmission device is described on the left and the operation of the second communication device 20 as the reception device is described on the right in FIG. 7, the operation of the communication system 1 will be described below in chronological order As shown in FIG. 7, first, in Step SP11, detection of zero crossing timing is performed by the zero crossing detecting section 102 in the first communication device 10 as the transmission device.

In next Step SP12, each of the initial packet signals KS1 to KS3 is sequentially transmitted from the first communication device 10 based on control of the communication controlling section 106 of the first communication device 10 in each zero crossing period while the transmission timing within the zero crossing period is changed. As thus described, when the respective zero crossing periods in which the initial packet signals KS1 to KS3 are transmitted are all considered, the respective initial packet signals KS1 to KS3 are transmitted in a plurality of pieces of transmission timing within the zero crossing periods.

Then, in Step SP13, the initial packet signals KS are sequentially received in the second communication device 20 as the reception device. When the initial packet signals KS are received, the operation step is shifted to Step SP14.

In Step SP14, demodulation processing is performed on each initial packet signal KS by the reception processing section 204 of the second communication device 20, and error detection based on the error detection code is further performed on data after the demodulation processing. It should be noted that the demodulation processing here includes multicarrier demodulation processing and subcarrier demodulation processing.

Such error detection is executed with respect to each of the initial packet signals KS1 to KS3 transmitted in each zero crossing period and a result of each error detection is outputted to the communication controlling section 206.

In next Step SP15, optimum communication timing is decided by the communication controlling section 206 out of the plurality of pieces of transmission timing within the zero crossing periods based on the result of the error detection regarding each of the initial packet signals KS1 to KS3. The optimum communication timing is decided with reference to a quality evaluation table BL as shown in FIG. 6. It should be noted that here, in addition to the optimum communication timing, the aspect of deciding a rank (quality rank) of communication quality indicating a communication state is also illustrated.

For example, when any of results of error detection on the respective initial packet signals KS1 to KS3 having been received is good, the quality rank is decided to be the highest rank A, and the optimum communication timing is decided to be the transmission timing T2 within the zero crossing period of the second initial packet signal KS2.

Further, when the result of error detection on the third initial packet signal KS3 is poor out of the results of error detection on the respective initial packet signals KS1 to KS3, the quality rank is decided to be a higher rank B, and the optimum communication timing is decided to be the transmission timing T2 within the zero crossing period of the second initial packet signal KS2.

Moreover, when the results of error detection on the second and third initial packet signal KS2 and KS3 are poor out of the results of error detection on the respective initial packet signals KS1 to KS3, the quality rank is decided to be a middle rank C, and the optimum communication timing is decided to be the transmission timing T1 within the zero crossing period of the first initial packet signal KS1.

Furthermore, when any of the results of error detection on the respective initial packet signals KS1 to KS3 is poor, the quality rank is decided to be the lowest rank D, and the optimum communication timing is not decided.

Then, in Step SP16, it is determined by the communication controlling section 106 as to whether or not the optimum communication timing has been decided, and when the optimum communication timing is decided, the operation process is shifted to Step SP17.

In Step SP17, an ACK signal RS is generated which includes timing information on optimum communication timing and communication state information on a quality rank, and the ACK signal RS is transmitted to the first communication device 10. It is to be noted that the timing information and the communication state information are collectively called communication information.

On the other hand, when the optimum communication timing is determined to have not been decided in Step SP16, the operation process is returned to Step SP13 without transmitting the ACK signal RS. That is, when the optimum communication timing is not decided, the second communication device 20 stands by for retransmission of the initial packet signal KS by the first communication device 10.

In Step SP18, in the first communication device 10, it is determined whether or not to have received the ACK signal RS indicating receiving the initial packet signal KS. When the ACK signal RS is received, the operation process is shifted to Step SP19. On the other hand, when the ACK signal RS is not received even after the lapse of predetermined time, the operation process is shifted to Step SP11, and the initial packet signal KS is retransmitted.

In Step SP19, optimum communication timing within the zero crossing period is specified by the communication controlling section 106 based on timing information included in the ACK signal RS, and the data packet signal DS including actual data is transmitted in the optimum communication timing. For example, when the optimum communication timing specified based on the timing information is the timing T2, the data packet signal DS is transmitted in the timing T2 within the zero crossing period. In Step SP20, it is determined by the communication controlling section 106 whether or not the number of transmission of the data packet signals DS in respective zero crossing periods has reached the number corresponding to the number of communication specified based on the communication state information on the quality rank which is included in the ACK signal RS. When transmission of the data packet signal DS is performed in number corresponding to the number of communication based on the quality rank, transmission of the data packet signal DS is suspended, and the operation process is shifted to Step SP11, in which the initial packet signal KS is retransmitted. That is, the communication operation is executed again from the training stage. It should be noted that the number of communication based on the quality rank is previously set per rank, such as ten times in the rank A, five times in the rank B and twice in the rank C.

As thus described, it is possible to early avoid deterioration in communication state by the return from the data transmission stage to the training stage in accordance with the communication quality, so as to improve reliability of communication.

On the other hand, in Step SP20, when transmission in number corresponding to the number of communication based on the quality rank is determined to have not been executed, the operation process is shifted to Step SP21.

In Step SP21, it is determined whether or not transmission of the data packet signal DS has been completed. When transmission of the data packet signal DS is not completed, the operation process is shifted to Step SP19, and the data packet signal DS continues to be transmitted.

On the other hand, when it is determined that transmission of the data packet signal DS has been completed in Step SP21, the communication operation of the communication system 1 is completed.

As thus described, in the communication system 1, each of the initial packet signals KS1 to KS3 is sequentially outputted from the first communication device 10 on the transmission side in each zero crossing period while the transmission timing within the zero crossing period is changed. The second communication device 20 on the reception side decides optimum communication timing out of a plurality of pieces of transmission timing within the zero crossing periods based on the result of the error detection on each of the initial packet signals KS1 to KS3. Then, information on the optimum communication timing is transmitted to the first communication device 10 on the transmission side by use of the ACK signal RS, and the first communication device 10 transmits the data packet signal DS in the optimum communication timing within the zero crossing period.

As thus described, the communication system 1 has the first communication device 10 and the second communication device 20 that performs electric power line communication with the first communication device 10 with the electric power line 30 used as a transmission path. The first communication device 10 has the zero crossing detecting section 102 for detecting zero crossing timing at regular intervals in a commercial power supply, and the transmission means for transmitting the initial packet signal KS added with an error detection code in each zero crossing period including zero crossing timing while changing transmission timing within the zero crossing period.

Then, the second communication device 20 has the error detecting section 244 for performing error detection on each of the initial packet signals KS, received in each zero crossing period, based on the error detection code added to each initial packet signal KS, the specification means for specifying optimum communication timing out of a plurality of pieces of transmission timing within the zero crossing periods based on a result of error detection on each initial packet signal KS, and the transmission means for transmitting the ACK signal RS including timing information on the optimum communication timing. Furthermore, the first communication device 10 has the reception means for receiving the ACK signal RS, and the transmission means of the first communication device 10 transmits the data packet signal DS including actual data in the optimum communication timing within the zero crossing period, which is specified based on the timing information.

As thus described, the second communication device 20 of the communication system 1 receives the initial packet signal KS in a plurality of pieces of timing within the zero crossing period, and specifies the optimum communication timing out of the plurality of pieces of timing. Then, the first communication device 10 transmits the data packet signal DS in the optimum communication timing within the zero crossing period which has been transmitted from the second communication device 20.

According to this, the data packet signal DS can be transmitted in optimum communication timing out of a plurality of pieces of timing within the zero crossing periods, thereby increasing the possibility of transmitting the data packet signal DS while avoiding the influence of phase noise or pulse noise. It is thereby possible to realize highly reliable power line communication in the communication system 1.

2. MODIFIED EXAMPLE

Although the preferred embodiment of the communication system 1 has been described above, the present invention is not restricted to the above described contents.

For example, although the communication timing of the data packet signal DS has been decided in the second communication device 20 on the reception side in the above preferred embodiment, this is not restrictive.

Specifically, the second communication device 20 may transmit results of error detection on the initial packet signals KS to the first communication device 10, and the first communication device 10 may decide the timing of communicating the data packet signal DS based on the results of error detection.

Specifically, the second communication device 20 adds the result of the error detection on the initial packet signal KS to the ACK signal RS, and transmits it to the first communication device 10. The first communication device 10 decides the timing of communicating the data packet signal DS based on the result of the error detection, which was added to the ACK signal RS, with reference to the quality evaluation table BL.

Further, although the communication quality rank has been used as the condition for the return from the data transmission stage to the training stage in the above preferred embodiment, this is not restrictive.

Figure 8:
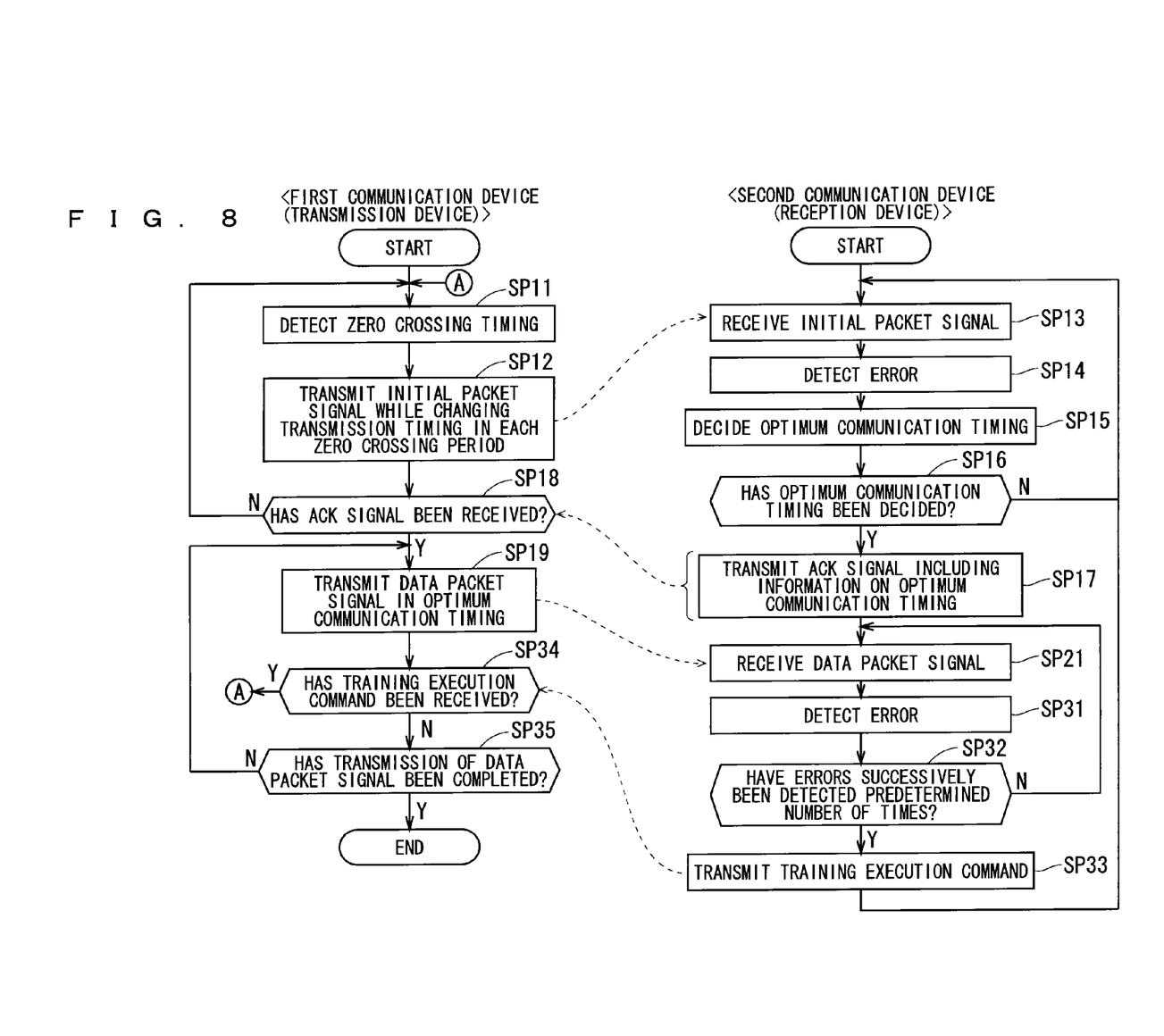
FIG. 8 is a flowchart showing an operation of a communication system according to a modified example.

Specifically, error detection may be performed on the data packet signal DS, and a result of the error detection on the data packet signal DS may be used as the condition for the return from the data transmission stage to the training stage. FIG. 8 is a flowchart showing an operation of the communication system 1 according to a modified example.

As shown in FIG. 8, after receiving the data packet signal DS in Step SP21, the second communication device 20 on the reception side performs error detection on the data packet signal DS in Step SP31.

Then, in next Step SP32, the second communication device 20 determines whether or not errors have successively been detected a plurality of times (e.g., twice). When errors are not successively detected in the successively received data packet signals DS, the operation process is shifted to Step SP21, and comes into a standby state for the next data packet signal DS.

On the other hand, when errors are successively detected in the successively received respective data packet signals DS, the operation process is shifted to Step SP33.

In Step SP33, the second communication device 20 transmits to the first communication device 10 a training execution command for shifting the process to the training stage, namely a retransmission command for retransmitting the initial packet signal KS. It is to be noted that the training execution command may be in the aspect of being transmitted as included in the ACK signal, for example.

In the first communication device 10 having received the training execution command, transmission of the data packet signal DS is suspended, the operation process is shifted to Step SP11, and the communication operation is executed again from the training stage.

As thus described, a result of error detection on the data packet signal DS may be used as the condition for the return from the data transmission stage to the training stage.

Further, time information may be used as the condition for the return from the data transmission stage to the training stage. In this case, in the first communication device 10 on the transmission side, clocking is started from the start of transmission of the data packet signal DS, and after the lapse of predetermined time, the process is returned to the training stage and the initial packet signal KS is retransmitted.

Further, a command from the communication controlling section 106 may be used as the condition for the return from the data transmission stage to the training stage. In this case, in accordance with the training execution command issued from the communication controlling section 106 as a higher layer, the process is returned from the data transmission stage to the training stage and the initial packet signal KS is retransmitted.

Further, reception of a NAC (Negative-Acknowledgement) signal may be used as the condition for the return from the data transmission stage to the training stage.

Specifically, in the case of not having been able to acquire actual data, such as the case of not having been able to receive the data packet signal DS or the case of not having been able to obtain actual data from the data packet signal DS by demodulation processing, the second communication device 20 may have the aspect of transmitting a negative response signal (NAC signal) RSn indicating that the actual data could not be acquired. In this case, the first communication device 10 having received the NAC signal RSn resumes the communication operation from the training stage.

Further, although the initial packet signal KS has been transmitted in three times of mutually different timing within the zero crossing periods in the above preferred embodiment, this is not restrictive. Specifically, the number of timing of transmitting the initial packet signal KS within the zero crossing periods may be another number, such as four or five times, of mutually different timing.

What is claimed is:

1. A communication system, comprising:
   a first communication device; and
   a second communication device that performs electric power line communication with the first communication device with an electric power line used as a transmission path, wherein
   the first communication device includes circuitry configured to:
      detect zero crossing timing at regular intervals in a commercial power supply, and
      transmit an initial signal added with an error detection code in each zero crossing period including zero crossing timing while changing transmission timing within each zero crossing period,
   the second communication device includes circuitry configured to:
      perform error detection on each initial signal received in each zero crossing period based on the error detection code added to said each initial signal,
      specify optimum communication timing out of a plurality of pieces of transmission timing within each zero crossing period based on a result of said error detection on said each initial signal, and
      transmit a response signal including timing information on said optimum communication timing,
   the circuitry of said first communication device further is configured to:
      receive said response signal, and
      transmit a transmission signal including actual data in said optimum communication timing within each zero crossing period, which is specified based on said timing information.

2. The communication system according to claim 1, wherein each shifting width with respect to said zero crossing timing of said plurality of pieces of transmission timing within each zero crossing period is set based on a frequency of the commercial power supply.

3. The communication system according to claim 1,
   wherein the circuitry of said second communication device is configured to:
      specify a communication state based on the result of said error detection on said each initial signal, and
      transmit said response signal including communication state information on said communication state, and
   wherein the circuitry of said first communication device is configured to:
      receive said response signal,
      transmit said transmission signal in each zero crossing period, and
      suspend transmission of said transmission signal in a case where a number of transmission of said transmission signal in each zero crossing period has reached the number corresponding to the number specified based on said communication state information, and retransmit said initial signal in each zero crossing period while changing the transmission timing within each zero crossing period.

4. The communication system according to claim 1, wherein
   the circuitry of said first communication device is configured to transmit in each zero crossing period said transmission signal added with said error detection code and including actual data,
   the circuitry of said second communication device is configured to perform error detection on each transmission signal received in each zero crossing period,
   the circuitry of said second communication device is configured to transmit a signal including a command to retransmit said initial signal based on the result of said error detection on said each transmission signal, and
   the circuitry of said first communication device is configured to suspend transmission of said transmission signal and retransmit said initial signal in each zero crossing period while changing the transmission timing within each zero crossing period in a case where the signal including the command to retransmit said initial signal is received.

5. A communication device on a transmission side, which performs electric power line communication with a communication device on a reception side with an electric power line used as a transmission path,
   said communication device on the transmission side comprising circuitry configured to:
      detect zero crossing timing at regular intervals in a commercial power supply; and transmit an initial signal added with an error detection code in each zero crossing period including zero crossing timing while changing transmission timing within each zero crossing period, said communication device on the reception side comprising circuitry configured to:

perform error detection on each initial signal received in each zero crossing period based on the error detection code added to said each initial signal, specify optimum communication timing out of a plurality of pieces of transmission timing within each zero crossing period based on a result of error detection on said each initial signal, and transmit a response signal including timing information on said optimum communication timing, the circuitry of said communication device on the transmission side further is configured to:

receive said response signal, and transmit a transmission signal including actual data in said optimum communication timing within each zero crossing period, which is specified based on said timing information.

6. A communication device on a reception side, which performs electric power line communication with a communication device on a transmission side with an electric power line used as a transmission path, wherein said communication device on the transmission side comprising circuitry configured to:

detect zero crossing timing at regular intervals in a commercial power supply, and transmit an initial signal added with an error detection code in each zero crossing period including zero crossing timing while changing transmission timing within each zero crossing period, and said communication device on the reception side comprising circuitry configured to:

perform error detection on each initial signal received in each zero crossing period based on the error detection code added to said each initial signal, specify optimum communication timing out of a plurality of pieces of transmission timing within each zero crossing period based on a result of error detection on said each initial signal, and transmit a response signal including timing information on said optimum communication timing.

7. A method for operating a communication system, which includes a first communication device and a second communication device, said second communication device performs electric power line communication with said first communication device with an electric power line used as a transmission path, said method comprising:

detecting, by said first communication device, zero crossing timing at regular intervals in a commercial power supply;

transmitting, by said first communication device, an initial signal added with an error detection code in each zero crossing period including zero crossing timing while changing transmission timing within each zero crossing period;

performing, by said second communication device, error detection on each initial signal received in each zero crossing period based on the error detection code added to said each initial signal;

specifying, by said second communication device, optimum communication timing out of a plurality of pieces of transmission timing within each zero crossing period based on a result of error detection on said each initial signal;

transmitting, by said second communication device, a response signal including timing information on said optimum communication timing; and transmitting, by said first communication device, a transmission signal that includes actual data in said optimum communication timing within each zero crossing period, which is specified based on said timing information included in said response signal.

8. The method for operating the communication system of claim 7, further comprising, performing, by said second communication device, demodulation processing on each initial signal received in each zero crossing period prior to said performing said error detection.

9. The method for operating the communication system of claim 7, wherein said optimum communication timing is determined in reference to a quality evaluation table.

10. The method for operating the communication system of claim 7, wherein said response signal includes communication state information, including a quality rank.

11. The method for operating the communication system of claim 7, further comprising determining, by said first communication device, whether said first communication device has received said response signal from the said second communication device.

12. The method for operating the communication system of claim 11, further comprising, retransmitting, by said first communication device, said initial signal when said first communication device determines that said first communication device has not received said response signal after a predetermined period of time.

\* \* \* \* \*